United States Patent [19]

La Force

[11] 4,392,603

[45] Jul. 12, 1983

[54] PREPARATION OF PIPE ENDS FOR SOLID PHASE WELDING

[75] Inventor: Jean La Force, P.O. Box C, Inverness, Calif. 94937

[73] Assignees: Carl Stringer, Pearland; Stringer Oil & Gas Co., San Angelo, both of Tex.; Jean La Force, Inverness, Calif.; Carl Thomas Stringer, Pearland, Tex. ; a part interest to each

[21] Appl. No.: 175,279

[22] Filed: Aug. 4, 1980

[51] Int. Cl.³ .......................... B23K 5/08; B23K 20/14
[52] U.S. Cl. ..................................... 228/196; 228/219; 228/265
[58] Field of Search ............... 228/196, 265, 219, 218, 228/220; 219/100, 101, 105

[56] References Cited

U.S. PATENT DOCUMENTS

| Re. 28,190 | 10/1974 | La Force | 219/161 X |
| 1,857,505 | 5/1932 | Heineman | 219/100 |
| 2,253,709 | 8/1941 | Iversen | 219/100 |
| 2,480,863 | 9/1949 | Kerr et al. | 219/101 |
| 3,684,856 | 8/1972 | Lifshits et al. | 219/100 X |

*Primary Examiner*—Kenneth J. Ramsey
*Attorney, Agent, or Firm*—Harris Zimmerman; Howard Cohen

[57] ABSTRACT

A system for preparing the abutting ends of pipe sections which are to be subsequently pressure welded together by the application of external heat to the joint and axial inward pressure on the respective pipe sections. The pipe ends are initially formed, or subsequently ground or cut so that the radially innermost portions of the ends are in contact with each other, and the radially outermost portions of the ends are slightly spaced from each other, preferably providing a radially outward diverging gap between the pipe ends.

2 Claims, 4 Drawing Figures

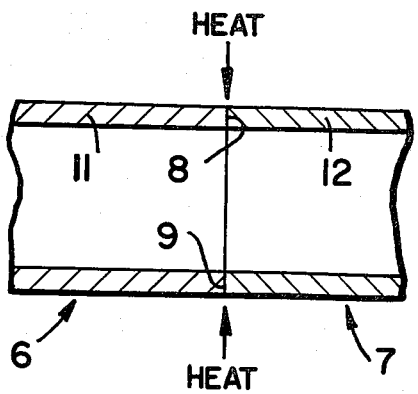
FIG_1
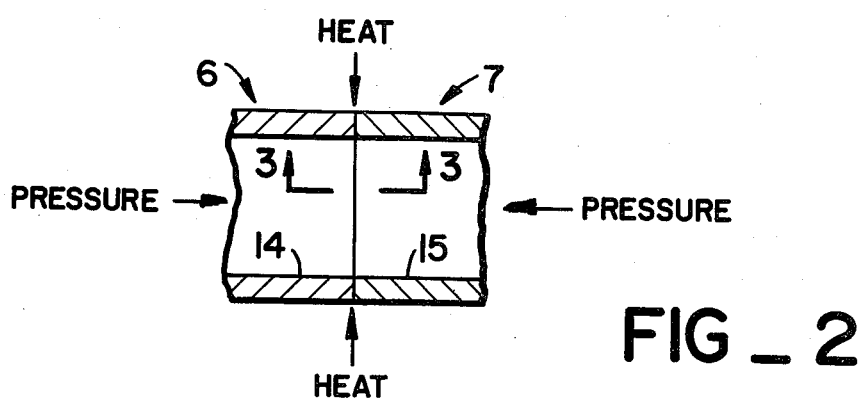
FIG_2
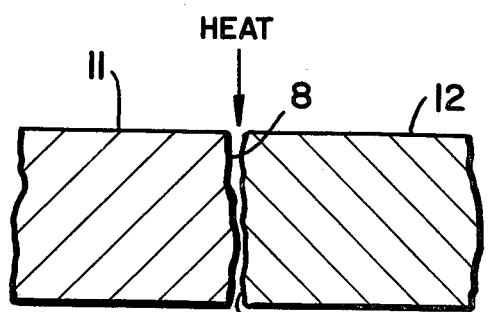
FIG_3
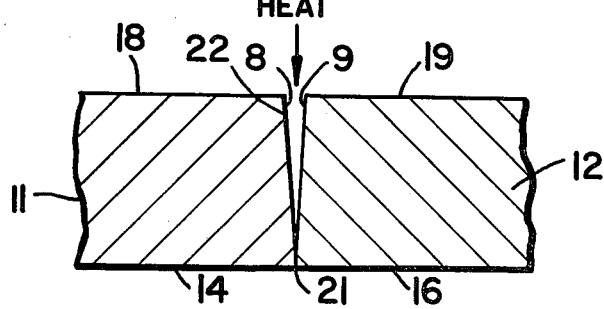
FIG_4

PREPARATION OF PIPE ENDS FOR SOLID PHASE WELDING

BACKGROUND OF THE INVENTION

The present invention is generally directed to the art of solid phase welding or pressure welding of pipes and the like. This general type of process is disclosed and described in U.S. Pat. No. Re. 28,190 of Oct. 8, 1974. In performing solid phase welding to join pipe sections together, the usual practice of supplying the heat to raise the temperature of the pipe end to sub-fusion and fusion conditions is by means of external burners. Such burners, which may be placed around the periphery of the joint, direct, for example, oxy-acetylene flames toward the exposed or outer end portions of the pipe sections. However, the normally hidden or inner end portions of the pipe sections are not in direct contact with the flames, but instead are effectively exposed to the ambient atmosphere.

Accordingly, during the heating process, undesirable and deleterious oxides will form along the inner abutting edges of the walls of the pipe sections. It might be explained at this time that while reference is being primarily made in this application to welding of pipe wherein the problem is particularly acute, the concepts of this invention are also applicable when solid phase welding any objects in which flame heating is applied only from one side or surface of the thickness of sections being joined, while the other side or surface is exposed to the atmosphere.

SUMMARY OF THE INVENTION

The present invention is directed towards an arrangement wherein the finished welded joint resulting from a solid phase weld contains a minimum amount of undesirable oxides even though the heating flames are directed only on one side surface of the material being joined. This is generally the result of effectively precluding the oxygen in the atmosphere along the other surface of the material being joined from entering the space between the abutting ends of the sections being welded together.

More particularly, a seal is provided at or adjacent the surface exposed to the atmosphere by utilizing a solid metal to metal contact between the abutting ends in such region, while providing a gap between the abutting ends at or adjacent the surface exposed to the flames of the heater. The rationale of such an arrangement is twofold. First, because of the inherent difficulty or high cost in producing or machining absolutely flush abutting pipe ends, by deliberately providing such ends with a slight taper, diverging radially outwardly, there is a reasonable assurance that the radially innermost portions of the abutting pipe end walls will be in contact with each other to provide the desired seal in the appropriate region. Secondly, by having the tapered or other gap at substantial portions of the confronting abutting surfaces, the actual contacting portions will be decreased. Accordingly, the axial upsetting load applied to the two sections will be greater at the contact portions than if the load was more evenly distributed across the cross-sectional area of the entire confronting surfaces. This further enhances the effectiveness of the seal at the desired portions during the welding operation.

BRIEF DESCRIPTION OF THE DRAWING

FIG. 1 is a cross-sectional view of two sections of pipe in confronting relation with heat being applied thereto preparatory to a solid phase welding operation.

FIG. 2 is a view similar to FIG. 1, and further diagramatically illustrating the application of axial upsetting pressure to urge the pipe sections together.

FIG. 3 is a cross-sectional view of a typical portion of the walls of the confronting pipes as shown in FIGS. 1 and 2, on an enlarged scale.

FIG. 4 is a view similar to FIG. 3, but illustrating the treatment or construction of the pipe ends in accordance with the teachings of the present invention.

DETAILED DESCRIPTION OF THE INVENTION

FIGS. 1 and 2 diagramatically illustrate a typical method of solid phase welding of two pipe sections 6 and 7. As explained in greater detail in U.S. Pat. No. Re. 28,190, such a method includes the placing of the end surface 8 of a pipe 6 adjacent to end surface 9 of pipe 7, applying heat around the outer peripheral surfaces of the respective pipe walls 11 and 12, and applying axial pressure or loading, forcing ends 8 and 9 towards each other while under heat to effect the weld.

The foregoing is illustrative of conventional pressure welding, and reference is now made to FIG. 3 wherein the confronting ends 8 and 9 of the pipe sections are shown on an enlarged scale. For purpose of explanation only, the irregularities of the end surfaces are exaggerated, but it will be understood that in the manufacture of pipe, the ends of the respective sections are not precision machined, and therefore the confronting surfaces will not form a perfect butt joint with all portions of such surfaces in contact.

Because of such irregularities, the radially innermost portions of the walls 11 and 12 may be spaced from each other, as indicated at 13, at that zone most remote from the application of external heat and thus expose the entire joint to the formation of oxides which tend to propagate and inhibit coalescence or fusion of the metal to metal pipe sections, and otherwise interfere with the production of a good weld.

In FIG. 4, there is illustrated the principle of the present invention wherein the end faces 8 and 9 are slightly beveled or tapered from the bottom to the top (as viewed in the drawing) or more particularly, such walls diverge radially outwardly from the inner bores 14, 16 of the pipe sections towards the outer peripheries 18, 19. The pipe walls are thus in contact, as at 21, in the zone remote from the heater wherein ambient atmosphere could otherwise permeate the weld joint from interior of the pipe, and a gap 22 is provided on the exterior portion of the joint.

When axial pressure is applied to the connection shown in FIG. 4, the entire load is concentrated at 21 and further insures against the leakage of ambient air from the interior of the pipe sections into the weld joint.

The degree or amount of taper or the size of gap 22 may be exaggerated in FIG. 4 for purpose of illustration and explanation. It will be understood that even though the application of pressure is initially concentrated in the zone 21, further heating and pressure will or should result in all of the confronting surface areas of the opposed faces 8 and 9 being brought in contacting relation and a coalescence or fusion of the parts together.

I claim:

1. The method of solid phase welding adjacent ends of axially aligned large diameter metal pipes in which the confronting faces of the respective pipe sections are brought into contiguous confronting relationship with ambient atmopsheric conditions prevailing within the pipe bores, and in which heat by means of external flame burner is applied substantially uniformly around the entire outer periphery of the abutting pipe ends while axial pressure is applied to said sections urging said faces towards each other, the improvement comprising sealing the ambient atmosphere within the pipe bores from the general area of the confronting faces by forming of at least one of said faces whereby the confronting faces are in continuous contact only along and adjacent the entire circumferential extent of the inner bore surfaces of the respective pipes and the confronting faces are spaced from each other other than at the bore surfaces to provide a circumferential gap in adjacent confronting relation to said heating flames, whereby the ambient air oxygen is excluded from said gap and no significant oxidation of the metal will take place thereat.

2. The method as set forth in claim 1 in which the cross-section of said gap diverges from said bore surfaces to the outer periphery of the pipe sections.

* * * * *